United States Patent
Wood

(10) Patent No.: US 10,143,298 B2
(45) Date of Patent: Dec. 4, 2018

(54) MODULAR STRUCTURAL SUPPORT APPARATUS AND METHOD OF CONSTRUCTING THE SAME

(71) Applicant: Douglas Wood, Fort Wayne, IN (US)

(72) Inventor: Douglas Wood, Fort Wayne, IN (US)

(*) Notice: Subject to any disclaimer, the term of this patent is extended or adjusted under 35 U.S.C. 154(b) by 0 days.

(21) Appl. No.: 15/093,195

(22) Filed: Apr. 7, 2016

(65) Prior Publication Data
US 2017/0290421 A1   Oct. 12, 2017

(51) Int. Cl.
| A47B 47/00 | (2006.01) |
|---|---|
| F16B 12/40 | (2006.01) |
| A47B 47/02 | (2006.01) |
| A47B 47/04 | (2006.01) |

(52) U.S. Cl.
CPC ...... *A47B 47/0008* (2013.01); *A47B 47/0091* (2013.01); *F16B 12/40* (2013.01); *A47B 47/021* (2013.01); *A47B 47/045* (2013.01); *A47B 47/047* (2013.01)

(58) Field of Classification Search
CPC ............. Y10T 403/46; Y10T 403/4602; Y10T 403/555; Y10T 403/4611; Y10T 403/7194; F16B 12/50; F16B 7/187; F16B 7/0493; F16B 12/44; F16B 12/40; A47B 47/0008; A47B 47/0091; A47B 47/047; A47B 47/021; A47B 47/045
USPC ......... 403/230, 231, 295, 263, 382, 256, 65, 403/170, 173, 403, 234, 205, 233, 236, 403/400; 52/655.1, 656.9, 653.2, 712; 211/183, 190, 206, 207, 192, 208, 187, 211/182, 191; 248/243, 245, 220.21, 248/220.22, 221.11, 222.11, 218.4, 219.3, 248/219.4
See application file for complete search history.

(56) References Cited

U.S. PATENT DOCUMENTS

| | | | |
|---|---|---|---|
| 1,214,738 A * | 2/1917 | Wolf | F16B 12/56 211/182 |
| 1,418,699 A * | 6/1922 | Collins | E04B 9/16 160/381 |
| 3,273,720 A * | 9/1966 | Seiz | A47B 57/402 108/107 |
| 3,571,987 A | 3/1971 | Anderson | |
| 3,603,274 A | 9/1971 | Ferdinand | |
| 3,638,803 A | 2/1972 | MacMillan | |
| 3,645,486 A | 2/1972 | Ferdinand | |
| 3,652,974 A | 3/1972 | Tems | |
| 3,653,734 A | 4/1972 | Ungaro | |
| 3,658,185 A | 4/1972 | Jacobson | |
| 3,661,434 A | 5/1972 | Alster | |
| 3,669,033 A | 6/1972 | Murcia | |
| 3,672,103 A | 6/1972 | Kost | |
| 3,680,712 A | 8/1972 | Jurasek | |
| 3,685,465 A | 8/1972 | Haumer | |
| 3,698,565 A | 10/1972 | Weber | |
| 3,700,300 A | 10/1972 | Davis | |

(Continued)

*Primary Examiner* — Hiwot E Tefera
(74) *Attorney, Agent, or Firm* — Jacque R. Wilson; Wilson Law Group, LLP

(57) ABSTRACT

A modular structural support system, having: a plurality of vertically disposed frame support beams, a plurality of horizontally disposed frame support beams, a plurality of fastener devices, fastener devices rigidly connected to the ends of the horizontally disposed support beams and rotatably and selectively lockingly attachable to one of the vertically disposed support beams.

18 Claims, 12 Drawing Sheets

(56) References Cited

U.S. PATENT DOCUMENTS

| | | | |
|---|---|---|---|
| 3,726,551 A | 4/1973 | Levenberg | |
| 3,729,242 A | 4/1973 | Barney | |
| 3,736,035 A | 5/1973 | Brown | |
| 3,779,177 A | 12/1973 | Gigante | |
| 3,790,241 A | 2/1974 | Messinia | |
| 3,791,091 A | 2/1974 | De Cervin | |
| 3,837,299 A | 9/1974 | McClellan | |
| 3,851,980 A | 12/1974 | Worth | |
| 3,871,784 A * | 3/1975 | Van Horn | F16B 7/0486 |
| | | | 211/206 |
| 3,901,164 A | 8/1975 | Urti | |
| 3,908,566 A | 9/1975 | Frazelle | |
| 3,919,950 A | 11/1975 | Frazelle | |
| 3,921,539 A | 11/1975 | Berger | |
| 3,964,810 A | 6/1976 | Murphy | |
| 3,994,549 A | 11/1976 | Davis | |
| 4,021,128 A | 5/1977 | Chiames | |
| 4,034,682 A | 7/1977 | Bizinover | |
| 4,070,803 A | 1/1978 | Gartung | |
| 4,079,678 A * | 3/1978 | Champagne | A47B 57/545 |
| | | | 108/106 |
| 4,084,125 A | 4/1978 | King | |
| 4,100,709 A | 7/1978 | Good | |
| 4,102,275 A | 7/1978 | Spound | |
| 4,148,535 A | 4/1979 | Fenwick | |
| 4,155,311 A | 5/1979 | Jackovin | |
| 4,162,113 A | 7/1979 | Pallavicini | |
| 4,184,433 A | 1/1980 | Green | |
| 4,204,375 A | 5/1980 | Good | |
| 4,232,845 A | 11/1980 | Turner | |
| 4,236,642 A * | 12/1980 | Klein | A47B 57/482 |
| | | | 211/182 |
| 4,247,011 A | 1/1981 | Walter | |
| 4,261,470 A * | 4/1981 | Dolan | F16B 12/36 |
| | | | 108/55.1 |
| 4,265,501 A | 5/1981 | Halliburton | |
| 4,275,665 A | 6/1981 | Silverman | |
| 4,344,367 A | 8/1982 | Merl | |
| 4,425,049 A * | 1/1984 | Travis | A47B 57/50 |
| | | | 211/191 |
| 4,438,852 A | 3/1984 | Evans | |
| 4,453,640 A | 6/1984 | Cillario | |
| 4,523,526 A | 6/1985 | O'Neill | |
| 4,545,168 A | 10/1985 | Dalton, Jr. | |
| 4,549,712 A | 10/1985 | Simon | |
| 4,558,647 A | 12/1985 | Petersen | |
| 4,642,946 A | 2/1987 | Koch | |
| 4,666,201 A | 8/1987 | Chap | |
| 4,700,916 A | 10/1987 | Bastian | |
| 4,706,573 A | 11/1987 | Sielaff | |
| 4,716,699 A | 1/1988 | Crossman | |
| 4,730,739 A | 3/1988 | Semerau, Jr. | |
| 4,763,799 A | 8/1988 | Cohn | |
| 4,785,943 A | 11/1988 | Deffner | |
| 4,800,821 A | 1/1989 | Nook | |
| 4,836,478 A | 6/1989 | Sweere | |
| 4,838,749 A | 6/1989 | Potocjnak | |
| 4,930,563 A | 6/1990 | Finch | |
| 4,962,805 A | 10/1990 | Allen | |
| 4,964,350 A | 10/1990 | Kolvites | |
| 4,988,008 A * | 1/1991 | Blum | H02B 1/01 |
| | | | 211/182 |
| 4,993,561 A | 2/1991 | Stultz | |
| 4,994,940 A | 2/1991 | Thouvenin | |
| 4,995,323 A | 2/1991 | Kellems | |
| 5,014,487 A * | 5/1991 | King | A47B 47/027 |
| | | | 211/191 |
| 5,031,781 A | 7/1991 | Price | |
| 5,036,778 A | 8/1991 | Briosi | |
| 5,058,331 A | 10/1991 | Epps | |
| 5,090,579 A | 2/1992 | Major | |
| 5,101,989 A | 4/1992 | Jones | |
| 5,114,022 A | 5/1992 | Rood | |
| 5,114,024 A | 5/1992 | Meissner | |
| 5,127,717 A | 7/1992 | Martinez | |
| 5,147,120 A | 9/1992 | Ray | |
| 5,160,188 A | 11/1992 | Rorke | |
| 5,176,435 A | 1/1993 | Pipkens | |
| 5,182,438 A | 1/1993 | Oakes | |
| 5,185,982 A | 2/1993 | Hostetler | |
| 5,203,463 A | 4/1993 | Gold | |
| 5,205,630 A | 4/1993 | Welch | |
| 5,226,705 A | 7/1993 | Rorke | |
| 5,240,127 A | 8/1993 | Levin | |
| 5,244,220 A | 9/1993 | Cortez | |
| 5,271,337 A | 12/1993 | Kolvites | |
| 5,277,512 A | 1/1994 | Dwillies | |
| 5,279,231 A | 1/1994 | Kolvites | |
| 5,279,232 A | 1/1994 | Gollick | |
| 5,291,838 A | 3/1994 | Ferchau | |
| 5,322,024 A | 6/1994 | Avery | |
| 5,337,905 A | 8/1994 | Gast | |
| 5,345,737 A | 9/1994 | Latchinian | |
| 5,403,110 A * | 4/1995 | Sammann | E04B 1/5831 |
| | | | 403/205 |
| 5,409,122 A | 4/1995 | Lazarus | |
| 5,421,467 A | 6/1995 | Dittborn | |
| 5,423,251 A | 6/1995 | Kolvites | |
| 5,429,438 A | 7/1995 | Wood | |
| 5,439,123 A | 8/1995 | Nook | |
| 5,452,554 A | 9/1995 | Santana | |
| 5,466,058 A | 11/1995 | Chan | |
| 5,513,908 A | 5/1996 | Williams | |
| 5,549,373 A | 8/1996 | Bustos | |
| 5,582,116 A | 12/1996 | Spimpolo | |
| 5,582,305 A | 12/1996 | Howell, Sr. | |
| 5,605,238 A | 2/1997 | Jacobs | |
| 5,695,081 A | 12/1997 | Alkalay | |
| 5,704,699 A | 1/1998 | Pagelow | |
| 5,715,760 A | 2/1998 | Frascaroli | |
| 5,715,956 A | 2/1998 | Yoshida | |
| 5,719,366 A | 2/1998 | Thalanfeld | |
| 5,722,544 A | 3/1998 | Williams | |
| 5,754,995 A | 5/1998 | Behrendt | |
| 5,762,213 A | 6/1998 | Heneveld, Sr. | |
| 5,791,265 A | 8/1998 | Ellsworth | |
| 5,797,503 A | 8/1998 | Stevens | |
| 5,906,420 A | 5/1999 | Rozier, Jr. | |
| 5,918,432 A | 7/1999 | Mahone | |
| 5,954,411 A | 9/1999 | Katz | |
| 5,970,675 A | 10/1999 | Schray | |
| 6,021,613 A | 2/2000 | Reuter | |
| 6,044,988 A | 4/2000 | Yang | |
| 6,062,149 A | 5/2000 | Duvivier | |
| 6,070,536 A | 6/2000 | Cinkaj | |
| 6,073,786 A | 6/2000 | McCorkle, Jr. | |
| 6,116,436 A | 9/2000 | Ferrucci | |
| 6,123,034 A | 9/2000 | Moore | |
| 6,128,911 A | 10/2000 | Matthews | |
| 6,129,431 A | 10/2000 | Hansen, Jr. | |
| 6,138,558 A | 10/2000 | Harrington | |
| 6,138,583 A | 10/2000 | Mahone | |
| 6,152,553 A | 11/2000 | Wunderlich | |
| 6,167,664 B1 | 1/2001 | Reuter | |
| 6,170,678 B1 | 1/2001 | De La | |
| 6,202,867 B1 | 3/2001 | DiBlasi | |
| 6,216,397 B1 | 4/2001 | Chang | |
| 6,216,415 B1 | 4/2001 | Briosi | |
| 6,220,186 B1 | 4/2001 | Scharer | |
| 6,226,931 B1 | 5/2001 | Haversat | |
| 6,230,632 B1 | 5/2001 | Moore | |
| 6,230,909 B1 | 5/2001 | Suter | |
| 6,241,108 B1 | 6/2001 | Nakatani | |
| 6,260,488 B1 | 7/2001 | Yang | |
| 6,270,138 B1 | 8/2001 | Laskowski | |
| 6,283,890 B1 | 9/2001 | Schleuder | |
| 6,321,918 B1 | 11/2001 | Rollins | |
| 6,330,328 B1 | 12/2001 | Weir | |
| 6,333,981 B1 | 12/2001 | Weir | |
| 6,357,606 B1 | 3/2002 | Henry | |
| 6,367,213 B1 | 4/2002 | Reuter | |
| 6,394,564 B1 | 5/2002 | Mrotz, III. | |
| 6,422,398 B2 | 7/2002 | Lafontaine | |

(56) References Cited

U.S. PATENT DOCUMENTS

| | | | | |
|---|---|---|---|---|
| 6,422,523 B1 * | | 7/2002 | Weshler | A47B 57/402 248/220.22 |
| 6,427,855 B2 | | 8/2002 | Labruna, Jr. | |
| 6,431,090 B1 * | | 8/2002 | Davis | A47B 57/04 108/107 |
| 6,450,106 B2 | | 9/2002 | McIntyre | |
| 6,457,595 B1 | | 10/2002 | Pritchard | |
| 6,460,950 B2 | | 10/2002 | Spitzer | |
| 6,467,856 B1 | | 10/2002 | Chang | |
| 6,481,177 B1 | | 11/2002 | Wood | |
| 6,497,185 B1 | | 12/2002 | Barrett | |
| 6,536,157 B2 | | 3/2003 | Wijbenga | |
| 6,536,614 B2 | | 3/2003 | Hsia | |
| 6,550,880 B2 | | 4/2003 | Reuter | |
| 6,557,955 B2 | | 5/2003 | Saravis | |
| 6,585,117 B2 | | 7/2003 | Lafontaine | |
| 6,634,511 B2 | | 10/2003 | Manghera | |
| 6,658,994 B1 | | 12/2003 | McMillan | |
| 6,682,253 B2 * | | 1/2004 | Binna | A47B 57/26 211/182 |
| 6,726,065 B2 | | 4/2004 | Sanders | |
| 6,820,950 B1 | | 11/2004 | Sun | |
| 6,871,452 B2 | | 3/2005 | Berg | |
| 6,908,000 B2 | | 6/2005 | Craft | |
| 6,955,268 B2 | | 10/2005 | Waldron | |
| 6,976,732 B2 | | 12/2005 | Thomas | |
| 6,995,418 B2 | | 2/2006 | Skov | |
| 7,028,620 B1 | | 4/2006 | Lyndon | |
| 7,048,346 B2 | | 5/2006 | Saravis | |
| 7,114,826 B1 | | 10/2006 | Lilly | |
| 7,124,695 B2 | | 10/2006 | Buechler | |
| 7,293,785 B2 | | 11/2007 | Bush | |
| 7,334,692 B2 | | 2/2008 | Black | |
| 7,337,729 B2 * | | 3/2008 | Briosi | A47B 57/54 108/107 |
| 7,343,864 B2 | | 3/2008 | Canin | |
| 7,458,744 B2 * | | 12/2008 | Hall | A47B 57/485 211/193 |
| 7,497,531 B2 | | 3/2009 | Gross | |
| 7,510,090 B2 | | 3/2009 | Phillips | |
| 7,546,706 B2 | | 6/2009 | Kirkwood | |
| 7,549,255 B2 | | 6/2009 | Kirkwood | |
| 7,665,619 B2 | | 2/2010 | Mangano | |
| 7,677,010 B2 | | 3/2010 | Boots | |
| 7,686,173 B2 | | 3/2010 | Robinson | |
| 7,699,756 B2 * | | 4/2010 | Piane, Jr. | A63B 1/00 248/222.52 |
| 7,717,376 B2 * | | 5/2010 | Sparks, Jr. | F16B 7/18 248/145 |
| 7,793,599 B2 | | 9/2010 | Truksa | |
| 7,870,966 B2 | | 1/2011 | Swanson | |
| 7,918,515 B2 | | 4/2011 | Wang | |
| 7,922,417 B2 | | 4/2011 | Jimenez | |
| 7,926,227 B2 | | 4/2011 | Mower | |
| 7,950,538 B2 | | 5/2011 | Zang | |
| 8,011,484 B2 | | 9/2011 | McIntyre | |
| 8,028,846 B2 | | 10/2011 | Peota | |
| 8,091,846 B1 * | | 1/2012 | Britner | B25H 1/00 248/219.3 |
| 8,328,027 B2 | | 12/2012 | Barkdoll | |
| 8,388,073 B2 | | 3/2013 | Richter | |
| 8,505,728 B2 | | 8/2013 | Su | |
| 8,550,263 B2 | | 10/2013 | Martin | |
| 8,567,615 B1 | | 10/2013 | Rainey | |
| 8,584,873 B2 | | 11/2013 | Horn | |
| 8,646,618 B2 | | 2/2014 | Peota | |
| 8,665,583 B2 | | 3/2014 | Kinsley | |
| 8,668,209 B1 | | 3/2014 | Anzivino | |
| 8,939,296 B2 | | 1/2015 | Weyler | |
| 8,944,483 B2 | | 2/2015 | Richter | |
| 9,051,955 B2 | | 6/2015 | Turnipseed | |
| 9,066,588 B1 | | 6/2015 | Kumar | |
| 9,173,486 B2 | | 11/2015 | Richter | |
| 9,204,736 B2 | | 12/2015 | Lindblom | |
| 9,204,737 B2 | | 12/2015 | Lamarre | |
| 9,216,314 B2 * | | 12/2015 | Chen | A63B 21/16 |
| 9,226,577 B2 | | 1/2016 | Stepp | |
| 9,237,803 B2 | | 1/2016 | Kassanoff | |
| 2002/0153341 A1 * | | 10/2002 | May | A47B 47/021 211/189 |
| 2011/0020058 A1 * | | 1/2011 | Briosi | A47B 47/021 403/205 |

* cited by examiner

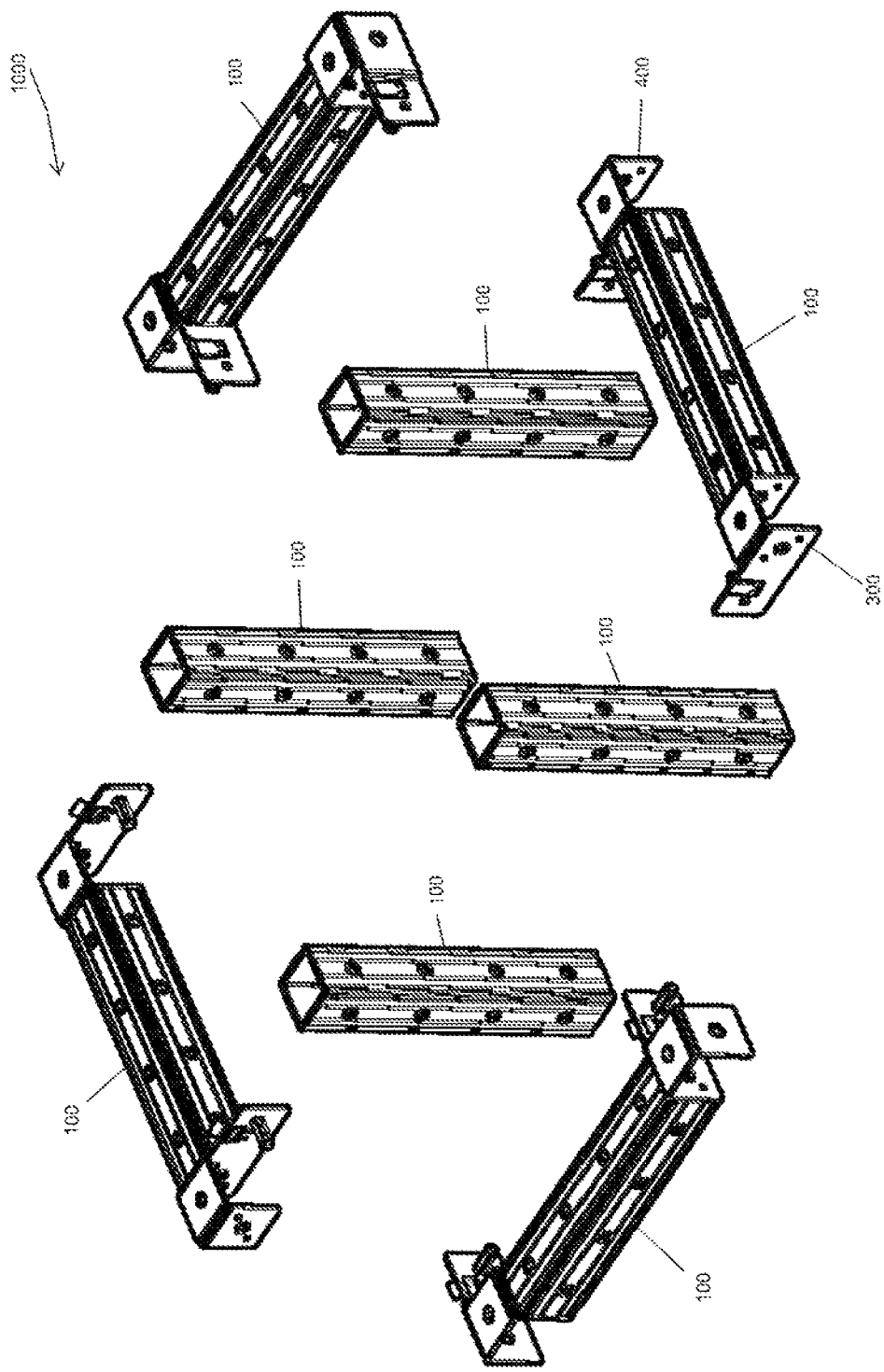

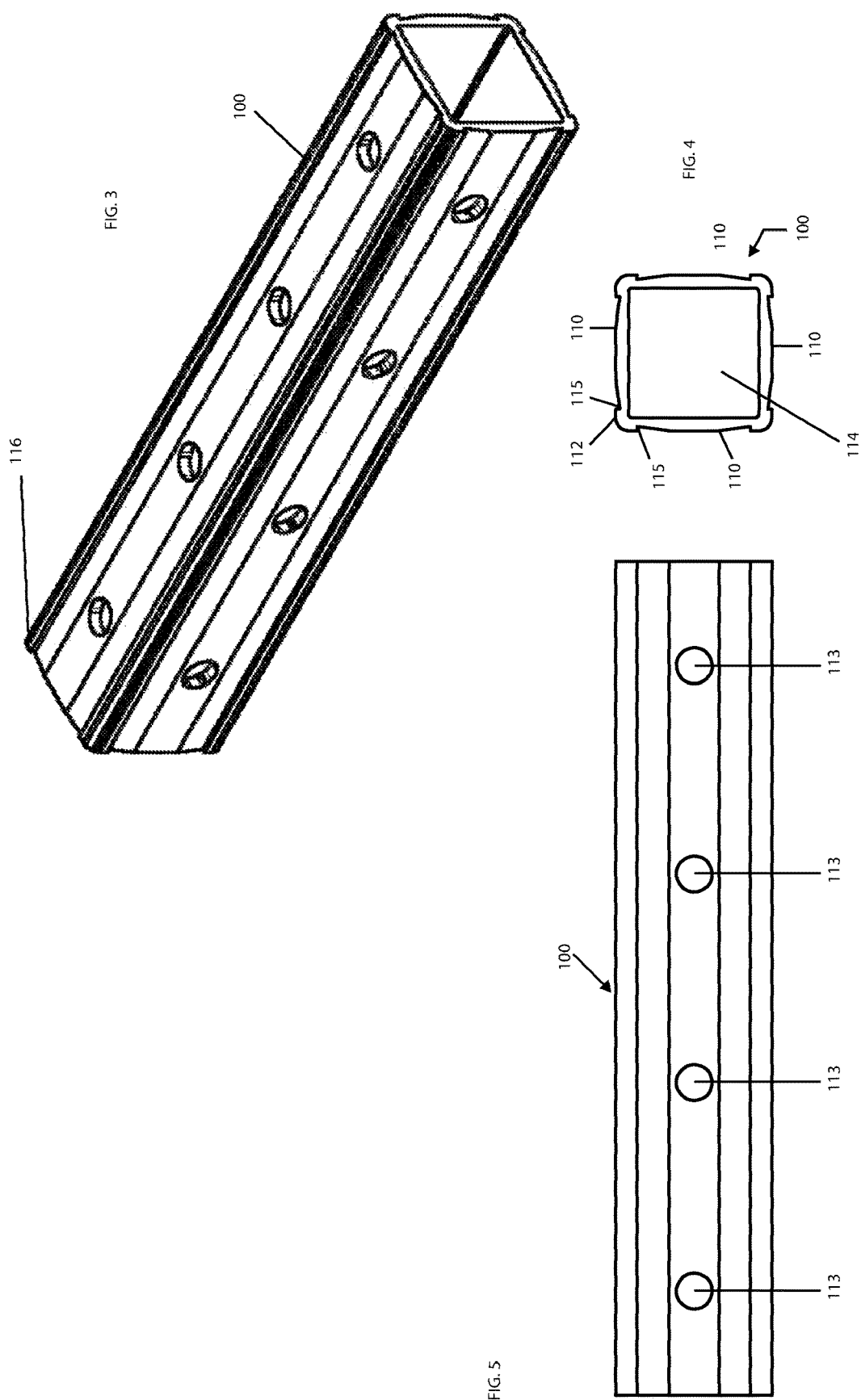

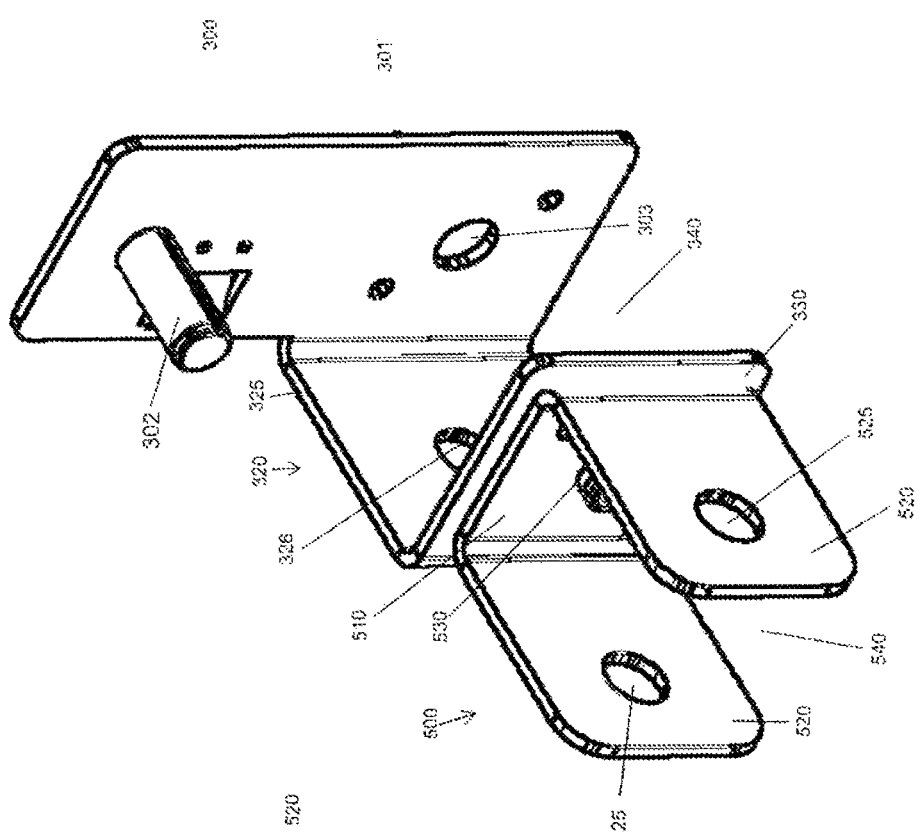
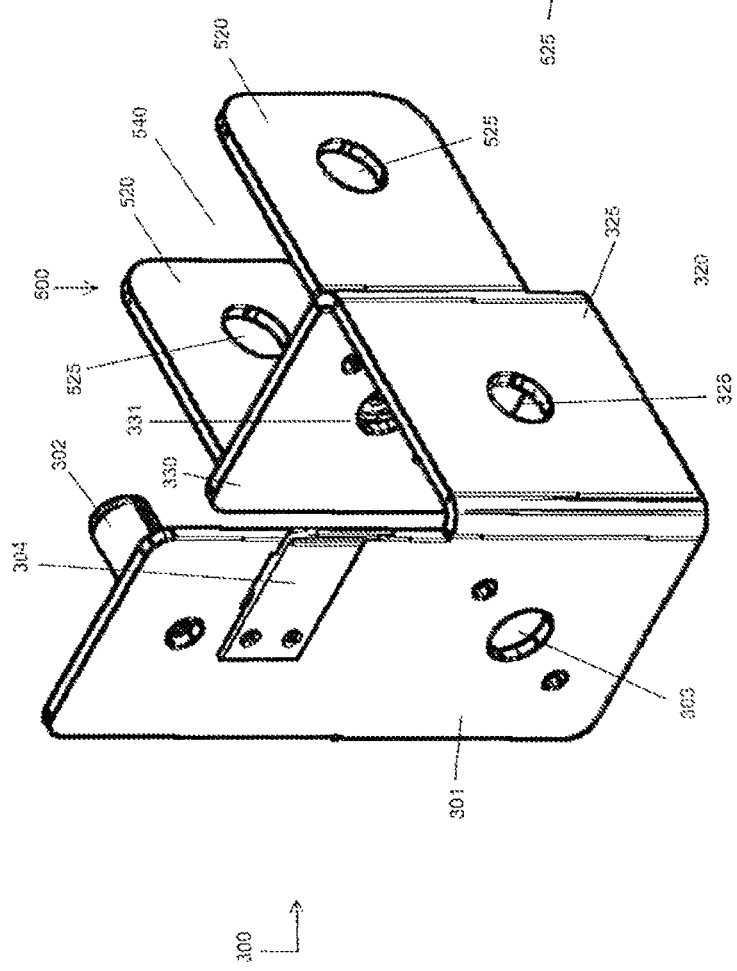

MODULAR STRUCTURAL SUPPORT APPARATUS AND METHOD OF CONSTRUCTING THE SAME

BACKGROUND

1. Field of the Invention

The present invention relates to modular structural support apparatuses and systems and, more particularly, to robust, easily assembled modular structural support systems, apparatuses, and methods of using the same.

2. Description of the Related Art

Free standing structural support assemblies are well known. However, as described below, prior art free standing structural support systems and apparatuses often cannot be assembled or disassembled rapidly without tools or by a single individual. Moreover, prior art structural support systems and apparatuses often lack sufficient modularity to be readily reconfigured to different heights to support differently sized objects.

U.S. Pat. No. 9,051,955 discloses a modular furniture system having a plurality of base frame elements used to construct modular furniture pieces. Base frame elements are usually rectangular in shape and utilize a plurality of struts. Each strut is joined to a neighboring strut with a strut connector. An outset strut connector has a protruding outset strut interlock that connects with an inset strut connector having an inset port. The interlocks utilize extremely strong magnets to draw and hold the connectors together. The struts each have one or more channel members which add strength and rigidity to the base frame elements and the furniture piece constructed therefrom. An interlocking panel may be attached to channel members to strengthen and interlock struts and/or base frame elements. Additionally, shelves, hinges, doors, shelf locks, lights, and other attachments can be connected to the channel members to enhance the functionality and appearance of the resulting furniture piece.

U.S. Pat. No. 8,550,263 discloses a modular rack and kit of parts for constructing a modular rack may be dimensioned to vary width and depth for different applications in different rooms. Retention accessories, including article hooks, extension cross members and shelves, each have attachment portions with mating cross-sectional profiles corresponding to the rack members engage the rack members circumferentially. The retention accessories are selectively reconfigurable for evolving storage needs.

U.S. Pat. No. 8,028,846 discloses a modular structural support system includes forming an H-shaped base structure, or otherwise-shaped base structure, by releasably hooking a tie beam into a first base piece and a second base piece. A first column member is slid into the first base piece by sliding an insert tab at an end of an elongate body of the first column into a vertical passage through the first base piece. A second column member is similarly slid into a second base piece. A header member is releasably hooked into the first and second columns, the header member extending substantially horizontally between the first and second columns and substantially perpendicularly to the first and second base pieces.

U.S. Pat. No. 7,922,417 discloses an interlocking structural element for the construction of cabinets and enclosures, including modular cabinets and enclosures. Four equal lengths of the interlocking structural element can be used in conjunction with simple flat rectangular panels to fabricate a single enclosure. Additional lengths may be used to fabricate an enclosure with multiple compartments. The interlocking structural element may be fabricated by extruding metal or other material such as plastic. The element incorporates slots for easy mounting of shelves, printed circuit boards or other objects within the enclosure.

U.S. Pat. No. 7,337,729 discloses modular structural support made of metal or other suitable material, having a plurality of risers or vertical elements with a polygonal section connected by horizontal elements such as longitudinal members with a lower side facing the floor surface and cross members to form the support for shelves. On two or more faces of the side surface of the risers, are provided a plurality of shaped recesses having depth (H) and defined by opposite walls being horizontally and vertically aligned among them, put near the vertexes or edges of the risers or vertical elements and cooperating with complementary shaped and depressed impressions formed on a hose clamp comprising opposite horizontal parallel branches and a vertical branch embracing the same risers and engaging with at least one longitudinal member and/or a cross member to which they are constrained by connection border elements.

U.S. Pat. No. 6,557,955 discloses a modular storage rack, display or cube system formed by snap together panels with alignment guides, which may also support wheels, shelves, drawers and doors. The system is assemble-in-place.

U.S. Pat. No. 6,481,177 discloses a connector for structural framing members having T-slots running lengthwise along a major surface of the structural framing member. The connector includes a pair of guides, each guide being sized to fit within a T-slot of one of the framing members for linear movement. A strut diagonally connects the pair of guides holding the guides mutually perpendicular to one another. The connector further includes each of the pair of guides being elongated in the direction of linear movement within a T-slot. Each guide further has a cross sectional shape in a direction perpendicular to the direction of elongation conforming to the interior shape of the T-slot. Each guide is also open at both ends in the direction of elongation allowing introduction of the guide to an open end of a T-slot of a structural framing member.

U.S. Pat. No. 5,277,512 discloses a joint for detachably connecting structural members. The connection is made with a T-shaped tongue on a first member which can be engaged in a T-shaped slot on a second member. The tongue is engaged in the slot by rotating it about its axis. Rotation of the tongue causes the end of the tongue to be drawn into the slot by wedging action between the tongue and sloped inner surfaces of the slot. The first and second members are held tightly together by tension which is developed in the tongue as the tongue is drawn into the slot.

U.S. Pat. No. 5,185,982 discloses a corner joint for locking in place upright and horizontal rail members of a modular assembly. The rail members are interconnected to form an open frame defining box-like modules for supporting structural support, side wall members, doors, and such like components. The corner joint positively locks the rail members in place and includes similarly shaped forks formed at the end sections of the horizontal rail members and a fork formed at an end section of the upright rail member. The tines of the forks of the horizontal rail members are provided with slots on the opposite side faces thereof. The tines of the forks of one horizontal rail member snugly and securely receive in the slots thereof the inside surfaces of a mating fork of another horizontal member. The inside surfaces of the tines of the upright member are snugly and securely received in the slots of the tines of the one horizontal rail member. A cross-like connection is formed among the horizontal and upright rail members whereby the receipt of the tines in the slots results in a positive lock at the corner interconnection.

U.S. Pat. No. 4,021,128 discloses a joint structure for connecting together shelves in a modular shelf assembly with first and second, coplanar, abutting shelves. A hole is formed through the shelves with one-half of the hole being formed in each shelf so as to complete the hole when the shelves are abutting each other. The shelves are sandwiched between first and second vertically extending supports which are connected together by fastening means extending through the hole in the shelves. Formed in the upper side of the shelves is an annular recess concentric with the hole and having an inverted cup-shaped bottom surface. An annular boss is formed on the end of the upper support and includes a cup-shaped end surface sized to fit within the recess. When the fastening means is tightened between the supports, the boss telescopes into the recess with the end surface seating against the bottom surface of the recess, camming the shelves together in abutting edgewise engagement and holding the shelves against edgewise separation without the end surface of the upper support engaging the upper surface of the shelves.

What is needed in the art is a robust, configurable, modular structural support apparatus that a single user can assemble manually without the need for tools.

SUMMARY

A modular structural support system, said system comprising: a plurality of vertically disposed frame support beams, each of said support beams comprising a hollow extruded cuboid shape having four sides and two ends and four edges, said support beams further comprising at least one bore disposed through each of said support sides, said support beams further comprising a plurality of undercut grooves disposed along the edges of said beams; a plurality of horizontally disposed frame support beams, each of said support beams comprising a hollow extruded cuboid shape having four sides and two ends, said support beams further comprising at least one bore disposed through each of said support sides, said support beams further comprising a plurality of undercut grooves disposed along the edges of said beams; a plurality of fastener devices, each of said fastener devices comprising three connected sides, wherein a first side is perpendicular to a second side and wherein said second side is perpendicular to a third side, where one of said sides is elongated relative to said other two sides, said fastener apparatus further comprising a channel between said sides, a support pin extending from said elongated side of said fastening device, and a flexible tab for selectively, releasably engaging one of said grooves on one of said beams, said fastener devices rigidly connected to one of said ends of said horizontally disposed support beams and rotatably and selectively, lockingly attachable to one of said vertically disposed support beams.

A modular structural support apparatus, said structural support apparatus comprising: a plurality of vertically disposed frame support beams, each of said support beams comprising a hollow extruded cuboid shape having four sides and two ends and four edges, said support beams further comprising at least one bore disposed through each of said support sides, said support beams further comprising a plurality of undercut grooves disposed along the edges of said beams; a plurality of horizontally disposed frame support beams, each of said support beams comprising a hollow extruded cuboid shape having four sides and two ends, said support beams further comprising at least one bore disposed through each of said support sides, said support beams further comprising a plurality of undercut grooves disposed along the edges of said beams; a plurality of fastener devices, each of said fastener devices comprising three connected sides, wherein a first side is perpendicular to a second side and wherein said second side is perpendicular to a third side, where one of said sides is elongated relative to said other two sides, said fastener apparatus further comprising a channel between said sides, a support pin extending from said elongated side of said fastening device, and a flexible tab for selectively, releasably engaging one of said grooves on one of said beams, said fastener devices rigidly connected to one of said ends of said horizontally disposed support beams and rotatably and selectively, lockingly attached to one of said vertically disposed support beams.

A method for assembling a structural support apparatus, said method comprising the steps of: providing a plurality of vertically disposed frame support beams, each of said support beams comprising a hollow extruded cuboid shape having four sides and two ends and four edges, said support beams further comprising at least one bore disposed through each of said support sides, said support beams further comprising a plurality of undercut grooves disposed along the edges of said beams; providing a plurality of horizontally disposed frame support beams, each of said support beams comprising a hollow extruded cuboid shape having four sides and two ends, said support beams further comprising at least one bore disposed through each of said support sides, said support beams further comprising a plurality of undercut grooves disposed along the edges of said beams; providing a plurality of fastener devices, each of said fastener devices comprising three connected sides, wherein a first side is perpendicular to a second side and wherein said second side is perpendicular to a third side, where one of said sides is elongated relative to said other two sides, said fastener apparatus further comprising a channel between said sides, a support pin extending from said elongated side of said fastening device, and a flexible tab; rotatably connecting said fastening devices connected to said horizontally disposed beams to said vertically disposed beams by inserting said pins into bores; rotating said horizontally disposed beams such that vertically disposed beams fit into said channels of said fastening devices; and releasably engaging said tabs into said grooves of said beams.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only. In the drawings:

FIG. 2 shows an exploded view of the apparatus in FIG. 1.

FIG. 3 shows a perspective view of a support beam for use with the present invention.

FIG. 4 shows an end view of the support beam of FIG. 3.

FIG. 5 shows a side view of the support beam of FIG. 3.

FIG. 8 shows a front perspective view of a fastening device for use with the present invention.

FIG. 9 shows a rear perspective view of the fastening device of FIG. 8.

Corresponding reference characters indicate corresponding parts throughout the several views. The exemplary embodiments set forth herein are not to be construed as limiting the scope of the invention in any manner.

DETAILED DESCRIPTION OF THE EMBODIMENTS

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
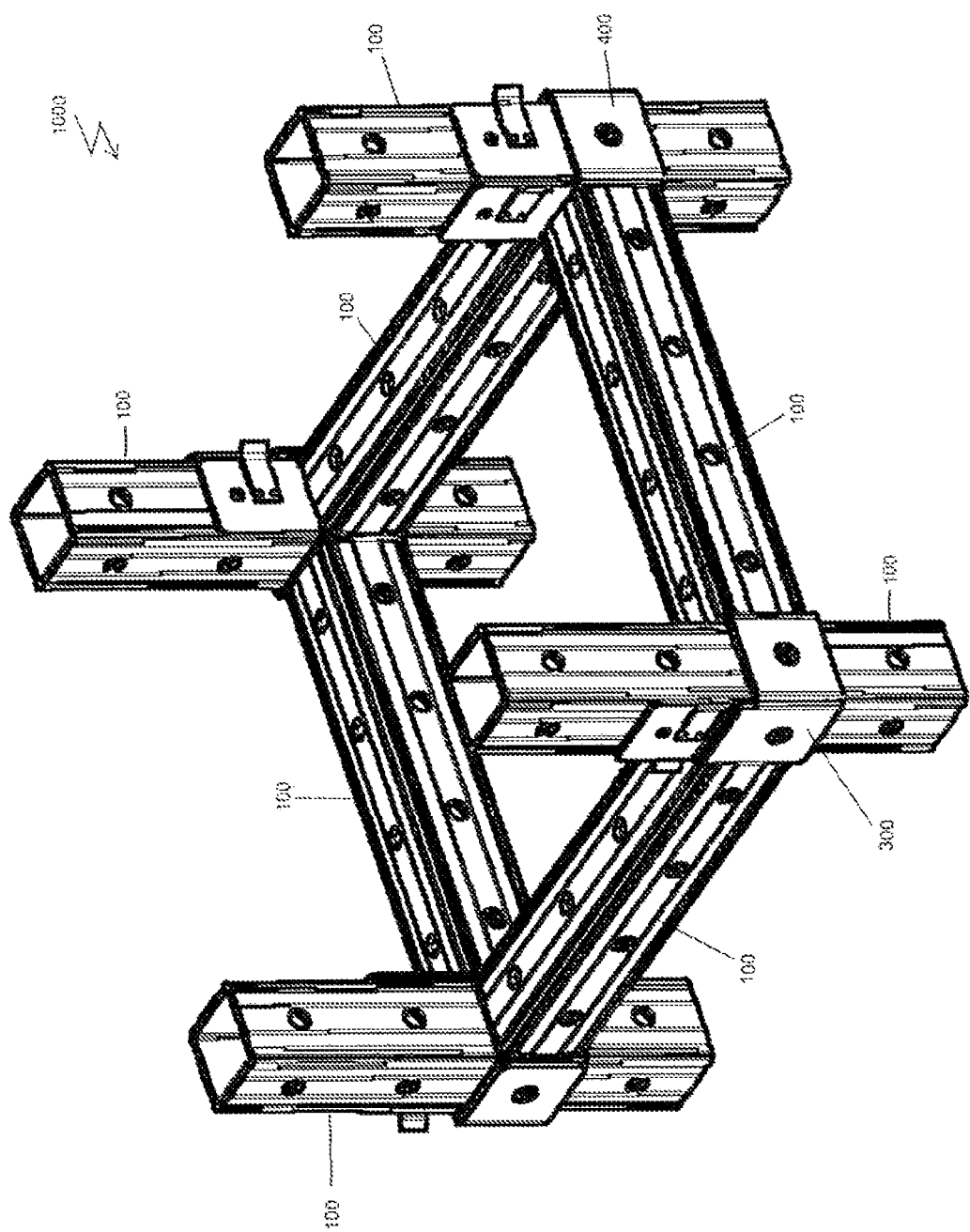
FIG. 1 shows an assembly view of an apparatus according to the present invention.

Referring first to FIG. 1, there is shown an assembly view of modular structural support apparatus 1000 according to an exemplary embodiment of the present invention. As illustrated in FIG. 1, structural support apparatus 1000 generally comprises a plurality of elongated support beams 100 and a plurality of fastening devices 300 and 400.

Referring next to FIG. 2, there is shown an exploded view of modular structural support apparatus 1000. As illustrated in FIG. 2, a plurality of vertically disposed support beams 100 are selectively connected to a plurality of horizontally disposed support beams 100 via fastener devices 300 and 400 as described in detail herein.

Referring now to FIG. 3, there is shown a perspective view of elongated support beam 100 for use with modular structural support apparatus 1000. As shown in FIG. 3, elongated support beam 100 generally comprises an elongated hollow cuboid shape. It should be appreciated that support beam 100 may comprise any suitable material for constructing a load bearing mechanical device including, for example, aluminum, steel, iron, or plastic. Moreover, support beam 100 may be of any desired length.

Referring now to FIG. 4, there is shown an end view of support beam 100, support beam 100 further comprises sides 110 central cannula 114. Once modular structural support apparatus 1000 is assembled, end users of apparatus 1000 may place wiring, piping, or other conduits through cannula 114.

Referring now to FIG. 5, there is shown a side view of support beam 100. As illustrated in FIG. 5, each side 110 of support beam 100 comprises a plurality of equally spaced apart cylindrical through bores 113. Each bore 113 comprises a cylindrical shape of identical radius. The longitudinal axis of each bore 113 is collinear with a bore 113 on the opposite side 110 of support beam 100.

Referring back to FIG. 3 and to FIG. 4, each support beam 100 further comprises longitudinally disposed, asymmetric, arcuate protruding edges 112 at each corner of vertical support member 100. As illustrated in FIG. 4, each asymmetric protruding edge 112 comprises a pair of undercuts 115, one disposed on each side of arcuate protruding edge 112. Undercuts 115 form grooves 116 (FIG. 3) disposed along each edges of vertical member 100 as shown in FIG. 5.

Figure 6:
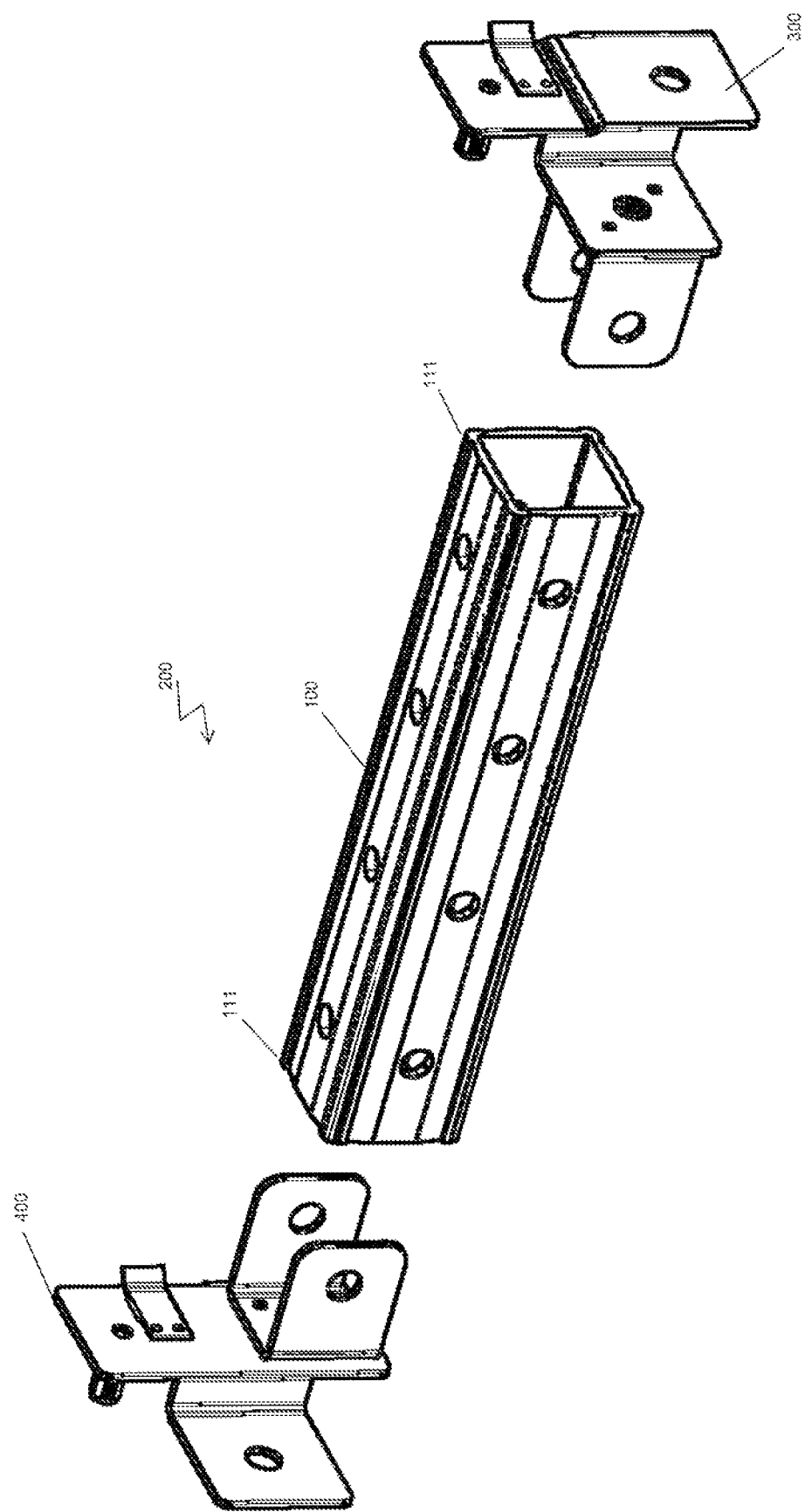
FIG. 6 shows an exploded view of a horizontal brace assembly according to the present invention.

Referring now to FIG. 6, where there is shown an exploded view of horizontal brace assembly 200 which includes support beam 100 and unattached fastening devices 300 and 400 for use with modular structural support apparatus 1000. Support beam 100 may comprise any suitable material for constructing a load bearing mechanical device including, for example, aluminum, steel, iron, or plastic. Moreover, support beam 100 of horizontal brace assembly 200 may be of any desired length. Support beam 100 of horizontal brace assembly 200 further comprises parallel opposing ends 111.

Figure 10:
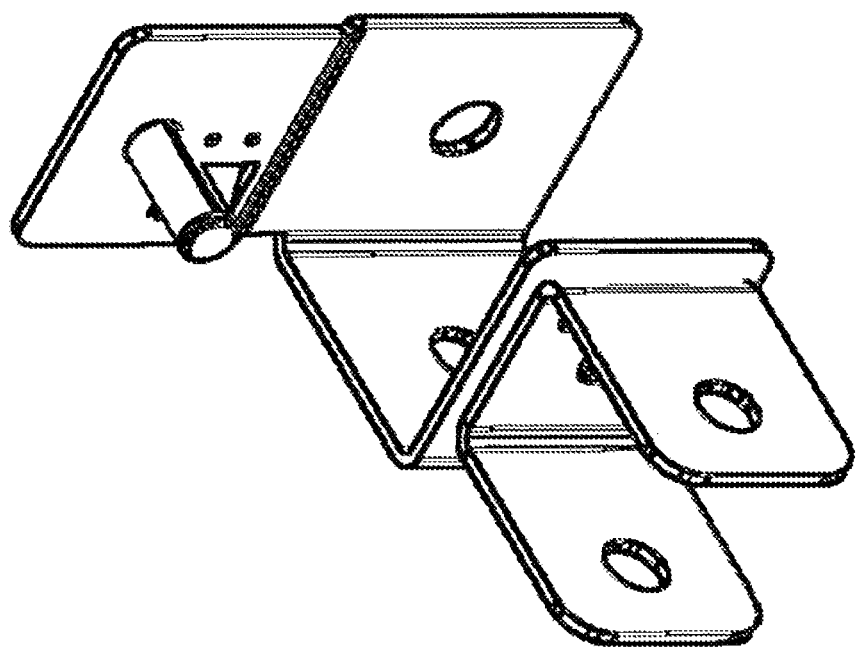
FIG. 10 shows a front perspective view of another size of the fastening device of FIG. 8.
Figure 11:
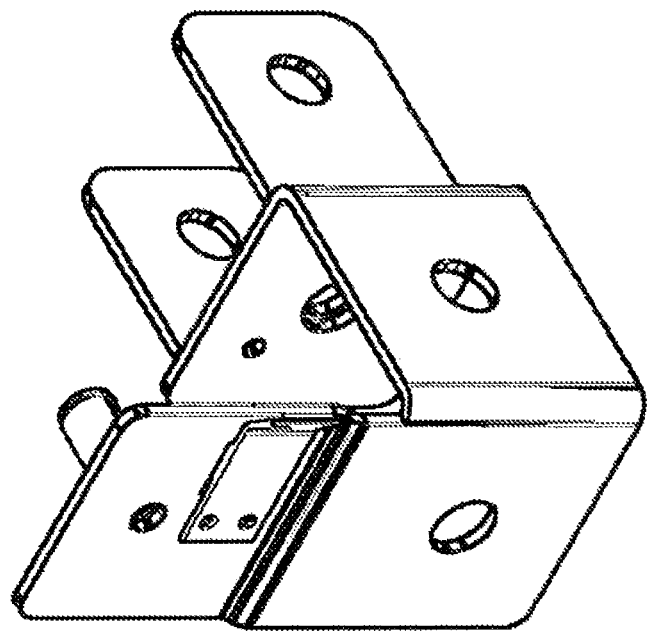
FIG. 11 shows a rear perspective view of the fastening device of FIG. 10.

Referring next to FIG. 8, where there is shown a front perspective view of fastening device 300, and to FIG. 9, where there is shown a rear perspective view of fastening device 300, fastening device 300 comprises base 301. (FIGS. 10 and 11 show another size of fastening device 300.)

Base 301 of fastening device 300 comprises a generally flat rectangular shape having an interior side and an exterior side. Base 301 of fastening device 300 further comprises support pin 302. Support pin 302 is cylindrical, and it extends perpendicularly from near the top of the interior side of base 301 of fastening device 300. Support pin 302 has an exterior diameter appropriate to slidingly and rotatably engage bores 113 of vertical support beams 100. Base 301 of fastening device 300 further comprises bore 303.

Referring still to FIG. 8 and to FIG. 9, fastening device 300 further comprises corner member 320 having a first plate 325 that extends perpendicularly from an edge of the interior surface of base 301. Corner member 320 extends from base 301 in the same direction as pin 302. Plate 325 has a first end and a second end. The first end of plate 325 is fixedly connected to an edge of base 301 of fastening device 300. Corner member 320 further comprises a second plate 330 having a first end and a second end. The first end of second plate 330 is fixedly attached to the second end of plate 325 such that plate 330 extends perpendicularly from plate 325 and parallel to base 301 of fastening device 300 thereby forming a channel 340.

Referring still to FIG. 8 and to FIG. 9, second plate 330 comprises cylindrical bore 331. Bore 331 of second plate 330 comprises a longitudinal axis that is collinear with that of bore 303 of base 301 of fastening device 300. First plate 325 comprises cylindrical bore 326. Bore 326 comprises a longitudinal axis that is perpendicular to the longitudinal axis of bore 331 of second plate 330 of corner 320 of fastening device 300. Fastening device 300 further comprises flexible anti-rotation tab 304 attached to base 301.

Figure 20:
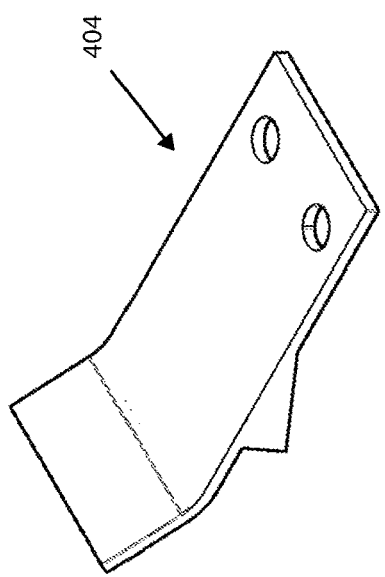
FIG. 20 shows a perspective view of an anti-rotation tab for use with the present invention.
Figure 22:
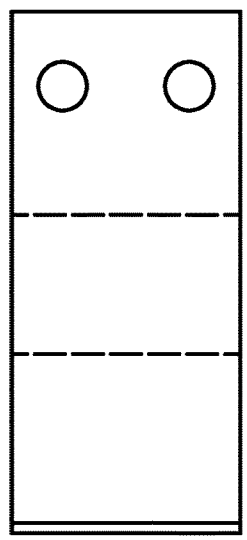
FIG. 22 shows a top view of the anti-rotation tab of FIG. 20.
Figure 21:
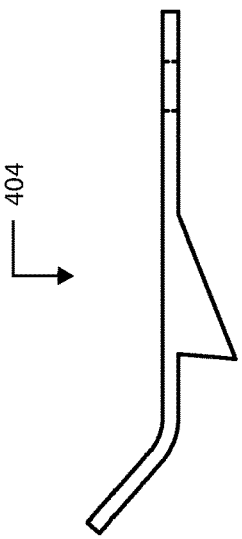
FIG. 21 shows a side view of the anti-rotation tab of FIG. 20.

Referring now to FIGS. 20-22, there are shown perspective, side, and top news, respectively, of flexible anti-rotation tab 304. Flexible tab 304 is a toggle or lever having a protrusion extending from a back surface. The protrusion of tab 304 is adapted to releasably engage undercut 115/groove 116, of vertical support member 100 such that a snap fit or tongue and groove connection is made between fastening device 300 and vertical support member 100 when modular structural support apparatus 1000 is assembled as shown in FIG. 1. Fastening device 300 further comprises brace connecting member 500.

Turning now generally to FIGS. 8-9 and 16-19, brace connecting member 500 comprises a flat bottom surface 510 and a pair of generally flat, opposing, parallel flanges 520 that protrude from opposing edges of the bottom 510 of brace connecting member 500 forming a channel 540. Flanges 520 protrude in the same direction as pin 302. Each of said flanges 520 comprises a bore 525. Bores 525 are preferably cylindrical. Each bore 525 further comprises a longitudinal axis. The longitudinal axis of each bore 525 is collinear with the other bore 525. Bottom 510 of brace connecting member 500 further comprises bore 530. Bore 530 is preferably cylindrical and located generally through the center of bottom 510. Bore 301 of corner member 320 is collinear with and abuts bore 530 of bottom 510 of brace connecting device 500.

Returning to FIG. 8, in an exemplary embodiment, connecting member 500 is mechanically connected to plate 330 of corner member 320. In one exemplary embodiment, brace connecting member 500 is riveted to corner member 320. However, brace connecting member 500 may be connected to corner member 320 by any known mechanical means such as a snap fit, tongue and groove connection, riveting, adhesive connection, or welding.

Figure 12:
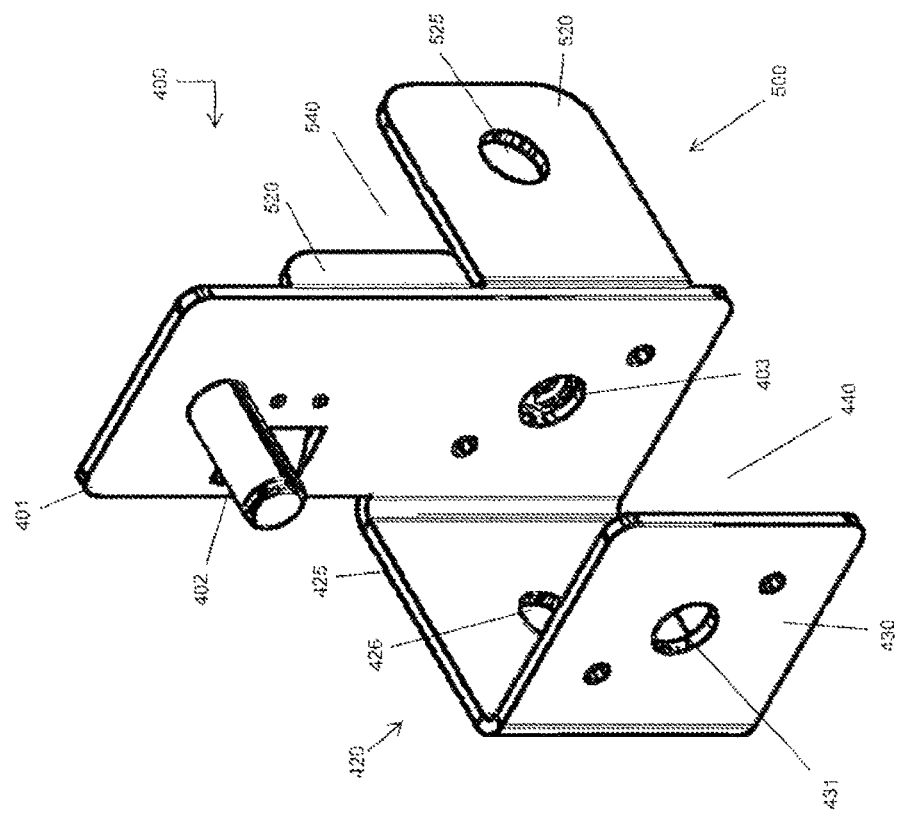
FIG. 12 shows a front perspective view of another fastening device for use with the present invention.
Figure 13:
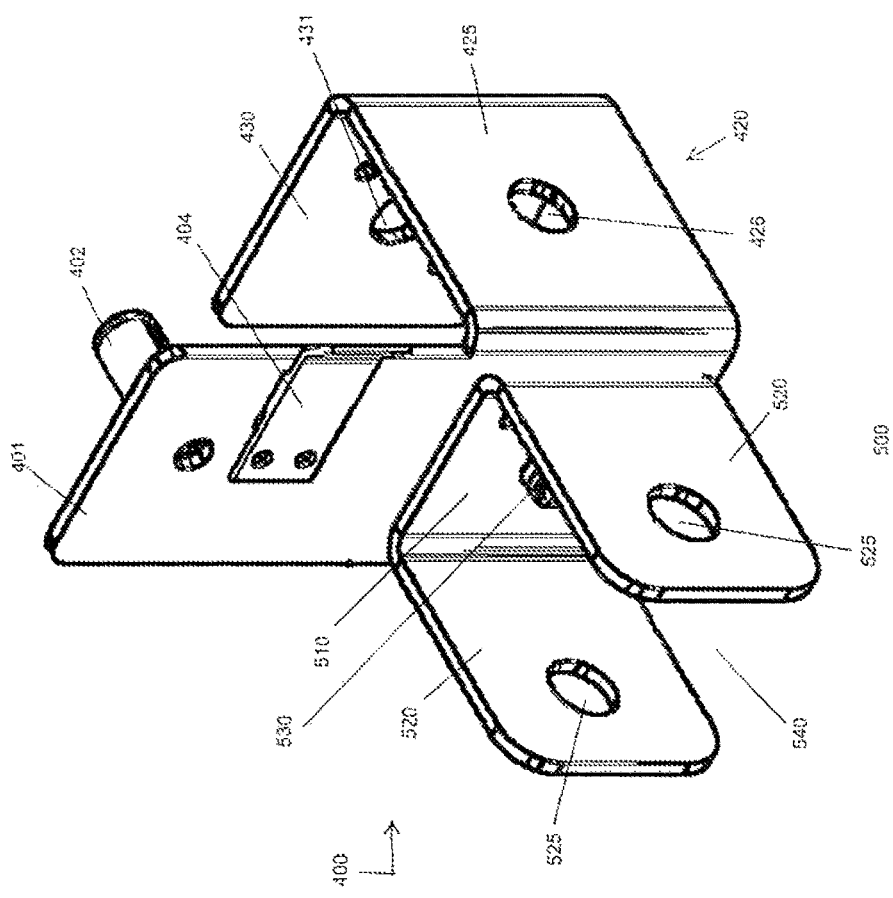
FIG. 13 shows a rear perspective view of the fastening device of FIG. 12.
Figure 14:
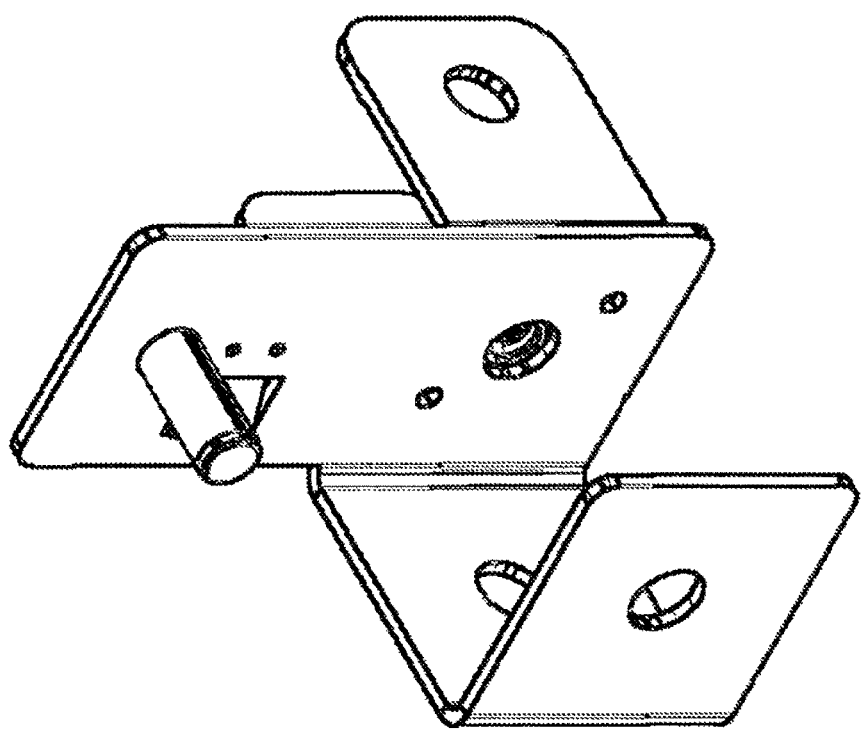
FIG. 14 shows a front perspective view of another size of the fastening device of FIG. 12.
Figure 15:
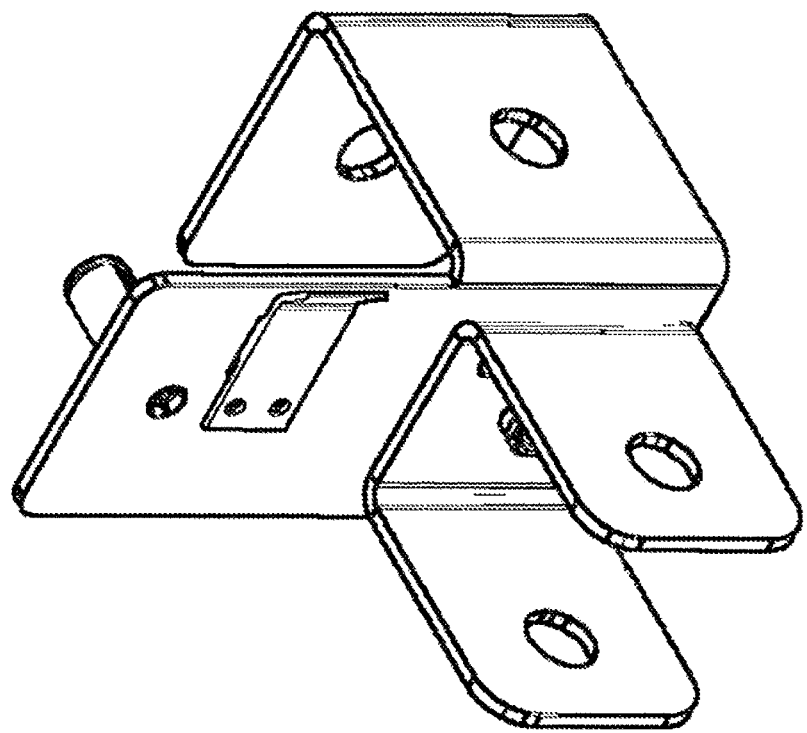
FIG. 15 shows a rear perspective view of the fastening device of FIG. 13.
Figure 16:
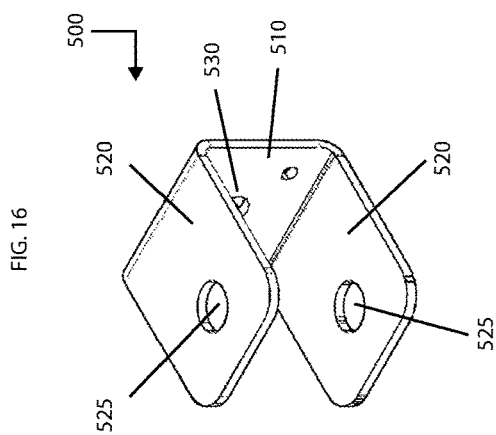
FIG. 16 shows a perspective new of a connecting member for use with the present invention.
Figure 19:
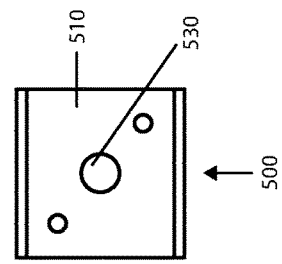
FIG. 19 shows a top view of the connecting member of FIG. 16.
Figure 17:
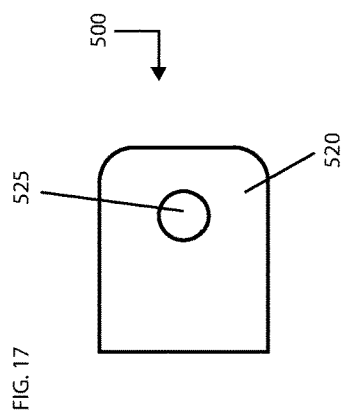
FIG. 17 shows a side view of the connecting member of FIG. 16.
Figure 18:
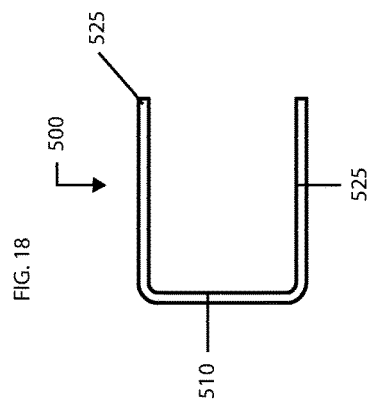
FIG. 18 shows another side view of the connecting member of FIG. 16.

Referring next to FIG. 12, where there is shown a front perspective view of fastening device 400, and to FIG. 13, where there is shown a rear perspective view of fastening device 400, fastening device 400 comprises base 401. (FIGS. 14 and 15 show another size of fastening device 400.) Base 401 of fastening device 400 comprises a generally flat rectangular shape having an interior side and an exterior side. Base 401 of fastening device 400 further comprises support pin 402. Support pin 402 is cylindrical, and it extends perpendicularly from near the top of the exterior side of base 401 of fastening device 400. Support pin 402 has an exterior diameter appropriate to slidingly and rotatably engage bores 113 of vertical support beams 100. Base 401 of fastening device 400 further comprises bore 403.

Referring still to FIG. 12 and to FIG. 13, fastening device 400 further comprises corner member 420 having a first plate 425 that extends perpendicularly from an edge of the exterior surface of base 401. Corner member 420 extends from base 401 in the same direction as pin 402. Plate 425 has a first end and a second end. The first end of plate 425 is fixedly connected to an edge of base 401 of fastening device 400. Corner member 420 further comprises a second plate 430 having a first end and a second end. The first end of second plate 430 is fixedly attached to the second end of plate 425 such that plate 430 extends perpendicularly from plate 425 and parallel to base 401 of fastening device 400 thereby forming a channel 440.

Referring still to FIG. 12 and to FIG. 13, second plate 430 comprises cylindrical bore 431. Bore 431 of second plate 430 comprises a longitudinal axis that is collinear with that of bore 403 of base 401 of fastening device 400. First plate 425 comprises cylindrical bore 426. Bore 426 comprises a longitudinal axis that is perpendicular to the longitudinal axis of bore 431 of second plate 430 of corner 420 of fastening device 400. Fastening device 400 further comprises flexible anti-rotation tab 404.

Referring now to FIGS. 20-22, there are shown perspective, side, and top news of flexible anti-rotation tab 404. Flexible tab 404 is a toggle or lever having a protrusion extending from a back surface. The protrusion of tab 404 is adapted to releasably engage undercut 115/groove 116, of vertical support member 100 such that a snap fit or tongue and groove connection is made between fastening device 400 and vertical support member 100 when modular structural support apparatus 1000 is assembled as shown in FIG. 1. Fastening device 400 further comprises brace connecting member 500.

Turning again generally to FIGS. 12-13 and 16-19, brace connecting member 500 comprises a flat bottom surface 510 and a pair of generally flat, opposing, parallel flanges 520 that protrude from opposing edges of the bottom 510 of brace connecting member 500 forming a channel 540. Flanges 520 extend in a direction opposite pin 402. Each of said flanges 520 comprises a bore 525. Bores 525 are preferably cylindrical. Each bore 525 further comprises a longitudinal axis. The longitudinal axis of each bore 525 is collinear with the other bore 525. Bottom 510 of brace connecting member 500 further comprises bore 530. Bore 530 is preferably cylindrical and located generally through the center of bottom 510. Bore 403 of fastening device 400 is collinear with and abuts bore 530 of bottom 510 of brace connecting device 500.

Returning to FIG. 12, in an exemplary embodiment, connecting member 500 is mechanically connected to the interior surface of base 401 of fastening device 400. In one exemplary embodiment, brace connecting member 500 is riveted to base 401 of fastening device 400. However, brace connecting member 500 may be connected to the interior surface of base 401 by any known mechanical means such as a snap fit, tongue and groove connection, riveting, adhesive connection, or welding.

Figure 7:
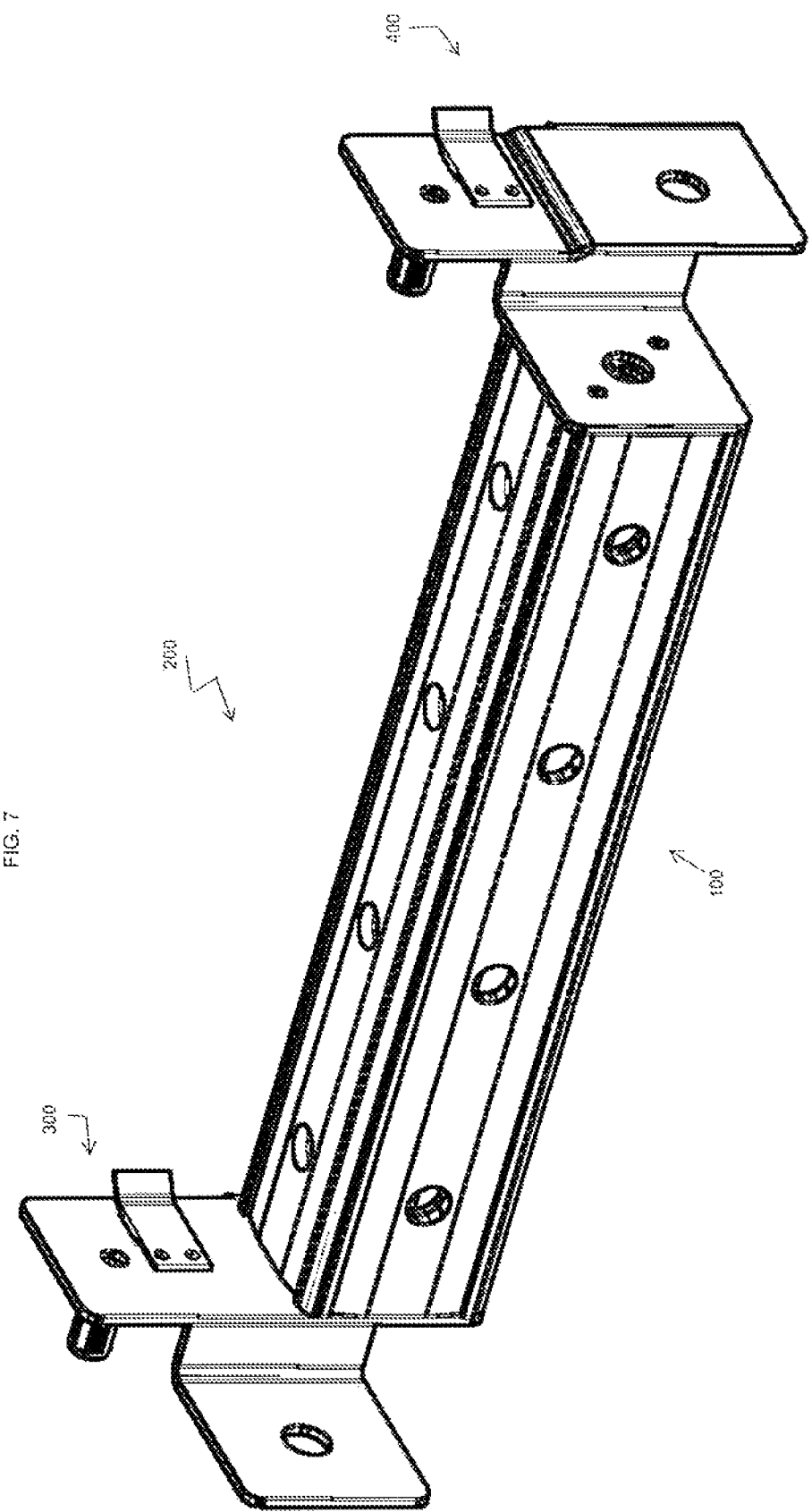
FIG. 7 shows an assembly view of the horizontal brace assembly of FIG. 6.

Referring now to FIG. 7, there is shown a perspective view of horizontal brace assembly 200 with support beam 100 attached to fastening devices 300 and 400 for use with modular structural support apparatus 1000. Horizontal brace assembly 200 may comprise any suitable material for constructing a load bearing mechanical device including, for example, aluminum, steel, iron, or plastic. Fastening devices 300 and 400 may be connected to horizontal brace assembly 200 may be cast, molded, or machined. Alternatively, fastening device 300 is a separate device connected to ends 111 of support beam 100 by known mechanical means such as a snap fit, tongue and groove connection, riveting, adhesive connection, or welding.

Alternatively, spaced apart flanges 520 (FIG. 6) of fastening devices 300 and 400 slidingly engage the interior walls of central cannula 114 of support beam 100 until the longitudinal axis of each bore 525 of each flange 520 is collinear with the longitudinal axis of a bore 113. Thereafter, a pin or other device can be inserted through bores 113 to attach fastening devices 300 and 400 to support beam 100.

Referring again generally to FIGS. 1-22, support beams 100 and fasteners 300 and 400 of the system 1000 of the present invention may further comprise steel, aluminum, plastic, copper, or brass. Additionally, system 1000 of the present invention may include a plurality of sizes of support beams 100 or fasteners 300 and 400.

Figure 23:
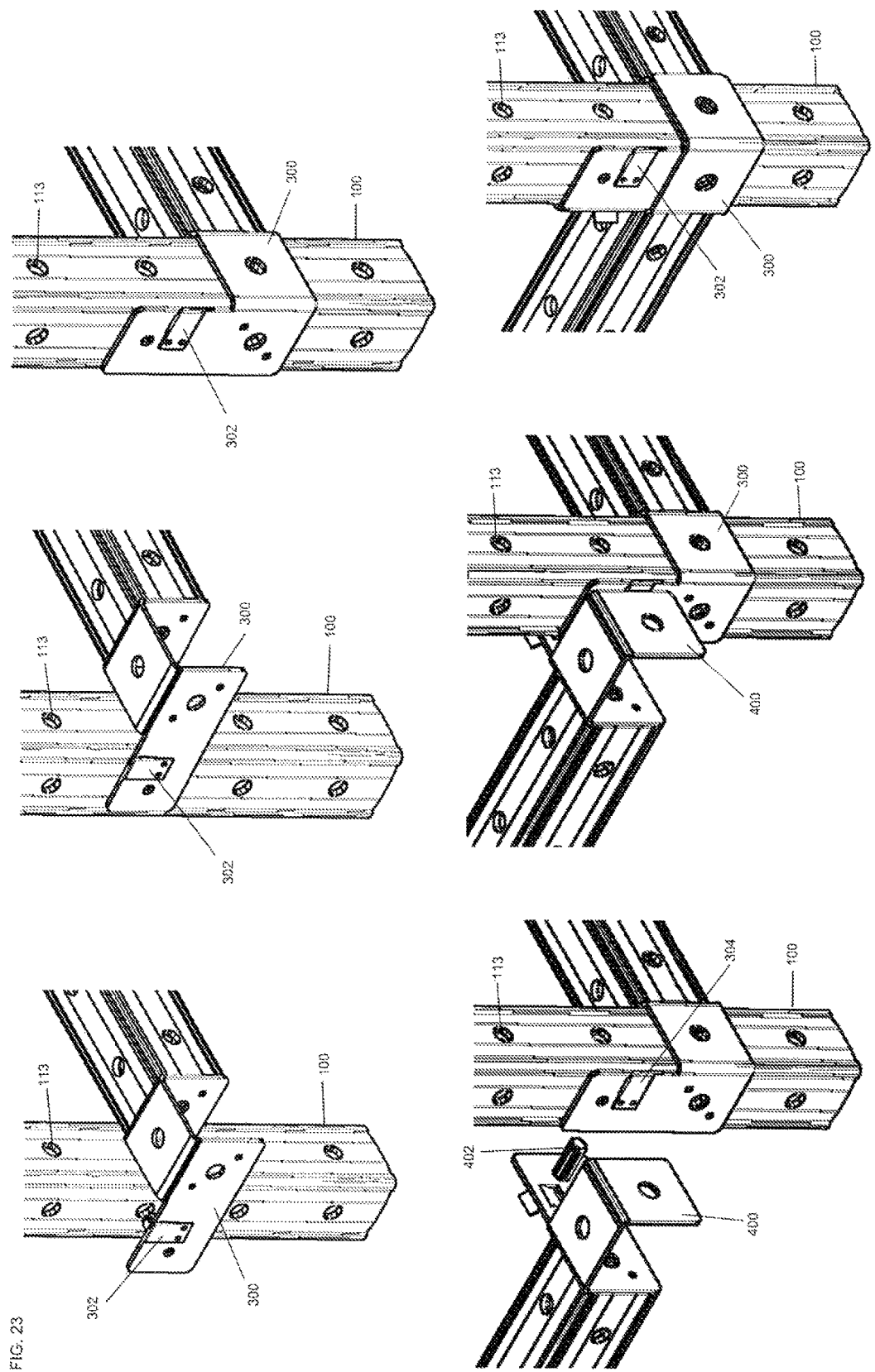
FIG. 23 shows a flow chart of a method of assembling the apparatus of FIG. 1.

Turning next to FIG. 23, there is shown a flow chart of steps in an exemplary embodiment of a method of assembling a modular structural support apparatus in accordance with the present invention. As illustrated in FIG. 23, a method of assembling structural support apparatus 1000 of the present invention comprises providing or acquiring a plurality of support beams 100. In an exemplary embodiment, four support beams 100 are arranged as vertical posts to form the corners, when viewed from above, of a regular geometric shape such as a square or rectangle.

As further illustrated in FIG. 23, the method of the present invention further comprises providing a plurality of brace members 200. Each brace member 200 comprises a horizontally disposed support beam 100 having opposing ends 111. Fastening device 300 is attached to one end 111, and fastening device 400 is attached to the other opposing end 111.

Referring still to FIG. 23, the method of the present invention further comprises attaching a first brace member 200 horizontally to a first pair of vertically disposed support beams 100. A support pin 302 of fastening device 300 of a first bracing member 200 is inserted into a bore 113 on one side 110 of vertically disposed support beam 100. A support pin 402 of fastening device 400 of the first bracing member 200 is inserted into a bore 113 on a parallel vertically disposed beam 100. Both bores 113 are collinear such that bracing member 200 is perpendicular to each vertically disposed beam 100.

As further illustrated in FIG. 23, bracing member 200 is urged to fully seat against first and second vertically disposed support beams 100. At this point, is rotatably connected to a first and second vertically disposed support beams 100. The method of the present invention then further comprises rotating bracing member up to about 180 degrees such that tabs 304 and 404 of corresponding fastening devices 300 and 400 releasably lockingly engage grooves 116 of on parallel vertically disposed support beams 100.

Referring again to FIG. 23, the method of the present invention further comprises attaching a second brace member 200 horizontally to a second pair of vertically disposed support beams 100 opposite the first pair of vertically disposed support beams 100. A first support pin 302 of fastening device 300 of a first bracing member 200 is inserted into a bore 113 on one side 110 of vertically disposed support beam 100. A second support pin 402 of fastening device 400 of the first bracing member 200 is inserted into a bore 113 on a parallel vertically disposed beam 100. Both bores 113 are collinear such that bracing member 200 is perpendicular to each vertically disposed beam 100.

As further illustrated in FIG. 23, bracing member 200 is urged to fully seat against first and second vertically disposed support beams 100. At this point, is rotatably connected to a first and second vertically disposed support beams 100. The method of the present invention then further comprises rotating bracing member up to about 180 degrees such that tabs 304 and 404 of corresponding fastening devices 300 and 400 releasably lockingly engage grooves 116 of on parallel vertically disposed support beams 100.

Referring again to FIG. 23, the method of the present invention further comprises attaching a third brace member 200 horizontally attached to a third pair of vertically disposed support beams 100, The third pair of vertically disposed support beams 100 comprises one vertical support beam 100 from each of the first and second pairs of vertical support beams 100. Said third pair thereby comprising a line that is perpendicular to each of said first and second pairs of vertical support beams 100.

A first support pin 302 of fastening device 300 of a first bracing member 200 is inserted into a bore 113 on one side 110 of vertically disposed support beam 100. A second support pin 402 of fastening device 400 of the first bracing member 200 is inserted into a bore 113 on a parallel vertically disposed beam 100. Both bores 113 are collinear such that bracing member 200 is perpendicular to each vertically disposed beam 100.

As further illustrated in FIG. 23, bracing member 200 is urged to fully seat against first and second vertically disposed support beams 100. At this point, is rotatably connected to a first and second vertically disposed support beams 100. The method of the present invention then further comprises rotating bracing member up to about 180 degrees such that tabs 304 and 404 of corresponding fastening devices 300 and 400 releasably lockingly engage grooves 116 of on parallel vertically disposed support beams 100.

Fastening devices 300 and 400 are provided in more than one size. Each of said fastening devices 300 and 400 is sized such that channels 340 and 440 fit over corresponding vertical beams 100 and previously engaged fastening devices 300 and 400.

Referring again to FIG. 23, the method of the present invention further comprises attaching a fourth brace member 200 horizontally attached to a third pair of vertically disposed support beams 100, The fourth pair of vertically disposed support beams 100 comprises one vertical support beam 100 from each of the first and second pairs of vertical support beams 100. Said fourth pair thereby comprising a line that is perpendicular to each of said first and second pairs of vertical support beams 100 and opposite said third pair of vertically disposed support beams 100.

A first support pin 302 of fastening device 300 of a first bracing member 200 is inserted into a bore 113 on one side 110 of vertically disposed support beam 100. A second support pin 402 of fastening device 400 of the first bracing member 200 is inserted into a bore 113 on a parallel vertically disposed beam 100. Both bores 113 are collinear such that bracing member 200 is perpendicular to each vertically disposed beam 100.

As further illustrated in FIG. 23, bracing member 200 is urged to fully seat against first and second vertically disposed support beams 100. At this point, is rotatably connected to a first and second vertically disposed support beams 100. The method of the present invention then further comprises rotating bracing member up to about 180 degrees such that tabs 304 and 404 of corresponding fastening devices 300 and 400 releasably lockingly engage grooves 116 of on parallel vertically disposed support beams 100.

Fastening devices 300 and 400 are provided in more than one size. Each of said fastening devices 300 and 400 is sized such that channels 340 and 440 fit over corresponding vertical beams 100 and previously engaged fastening devices 300 and 400.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A modular structural support system, said system comprising: a plurality of vertically disposed frame support beams, each of said support beams comprising a hollow extruded cuboid shape having four sides and two ends and four edges, said support beams further comprising at least one bore disposed through each of said support sides, said support beams further comprising a plurality of undercut grooves disposed along the edges of said vertically disposed frame support beams; a plurality of horizontally disposed frame support beams, each of said horizontally disposed frame support beams further comprising a hollow extruded cuboid shape having four sides and two ends, said horizontally disposed frame support beams further comprising at least one bore disposed through each of said support sides, said support beams further comprising a plurality of undercut grooves disposed along the edges of said horizontally disposed frame support beams; a plurality of fastener devices, each of said fastener devices comprising three connected sides, wherein a first side is perpendicular to a second side and wherein said second side is perpendicular to a third side, where one of said sides is elongated relative to said other two sides, said respective fastener device further comprising a channel between said sides, a support pin extending from said elongated side of said fastening device, and a releasable tab for selectively, releasably engaging one of said grooves on one of said vertically disposed support beams, said fastener devices connected to one of said ends of said horizontally disposed support beams and rotatably and selectively lockingly attachable to one of said vertically disposed support beams, wherein said vertically and horizontally disposed support beams comprise the same cross-sectional shape.

2. The system of claim 1, wherein the vertically and horizontally disposed support beams comprise a material selected from the group consisting of: steel, aluminum, plastic, copper, and brass.

3. The system of claim 1, wherein the fastening devices comprise a material selected from the group consisting of: steel, aluminum, plastic, copper, and brass.

4. The system of claim 1, further comprising a plurality of sizes of vertically and horizontally disposed support beams.

5. The system of claim 1, further comprising a plurality of sizes of fastening devices.

6. The system of claim 1, wherein the fastening devices are releasably connected to a support beam selected from the group consisting of vertically disposed and horizontally disposed support beams.

7. The system of claim 6, wherein the releasable connection is selected from the group consisting of a snap-fit, screws, nut and bolt, and pin.

8. The system of claim 1, wherein the fastening devices are fixedly connected to a support beam selected from the group consisting of vertically disposed and horizontally disposed support beams.

9. The system of claim 8, wherein the fixed connection is selected from the group consisting of an adhesive, a sonic weld, and a heat weld.

10. A modular structural support apparatus, said structural support apparatus comprising: a plurality of vertically disposed frame support beams, each of said support beams comprising a hollow extruded cuboid shape having four sides and two ends and four edges, said support beams further comprising at least one bore disposed through each of said support sides, said support beams further comprising a plurality of undercut grooves disposed along the edges of said vertically disposed frame support beams; a plurality of horizontally disposed frame support beams, each of said horizontally disposed frame support beams comprising a hollow extruded cuboid shape having four sides and two ends, said horizontally disposed frame support beams further comprising at least one bore disposed through each of said support sides, said support beams further comprising a plurality of undercut grooves disposed along the edges of said horizontally disposed frame support beams; a plurality of fastener devices, each of said fastener devices comprising three connected sides, wherein a first side is perpendicular to a second side and wherein said second side is perpendicular to a third side, where one of said sides is elongated relative to said other two sides, said respective fastener device further comprising a channel between said sides, a support pin extending from said elongated side of said fastening device, and a releasable tab for selectively, releasably engaging one of said grooves on one of said vertically disposed frame support beams, said fastener devices connected to one of said ends of said horizontally disposed support beams and rotatably and selectively lockingly attached to one of said vertically disposed support beams, wherein said vertically and horizontally disposed support beams comprise the same cross-sectional shape.

11. The apparatus of claim 10, wherein the vertically and horizontally disposed support beams comprise a material selected from the group consisting of steel, aluminum, plastic, copper, and brass.

12. The apparatus of claim 10, wherein the fastening devices comprise a material selected from the group consisting of: steel, aluminum, plastic, copper, and brass.

13. The apparatus of claim 10, further comprising a plurality of sizes of vertically and horizontally disposed support beams.

14. The apparatus of claim 10, further comprising a plurality of sizes of fastening devices.

15. The apparatus of claim 10, wherein the fastening devices are releasably connected to a support beam selected from the group consisting of vertically disposed and horizontally disposed support beams.

16. The apparatus of claim 15, wherein the releasable connection is selected from the group consisting of a snap-fit, screws, nut and bolt, and pin.

17. The apparatus of claim 10, wherein the fastening devices are fixedly connected to the support beams.

18. The apparatus of claim 17, wherein the fixed connection is selected from the group consisting of an adhesive, a sonic weld, and a heat weld.

* * * * *